United States Patent
Lee et al.

(10) Patent No.: US 11,895,607 B2
(45) Date of Patent: Feb. 6, 2024

(54) CLOCK SYNCHRONIZATION USING WIRELESS SIDE CHANNEL

(71) Applicant: Microsoft Technology Licensing, LLC, Redmond, WA (US)

(72) Inventors: Woo Suk Lee, Fort Lee, NJ (US); Flavio Protasio Ribeiro, Bellevue, WA (US); Alexander Popovich, Henderson, NV (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/886,068

(22) Filed: Aug. 11, 2022

(65) Prior Publication Data
US 2022/0386260 A1 Dec. 1, 2022

Related U.S. Application Data

(63) Continuation of application No. 17/007,461, filed on Aug. 31, 2020, now Pat. No. 11,463,973.

(60) Provisional application No. 63/016,640, filed on Apr. 28, 2020.

(51) Int. Cl.
*G06F 15/16* (2006.01)
*H04W 56/00* (2009.01)

(52) U.S. Cl.
CPC .............. *H04W 56/0015* (2013.01)

(58) Field of Classification Search
CPC ................................. H04W 56/0015
See application file for complete search history.

(56) References Cited

U.S. PATENT DOCUMENTS

| | | | | |
|---|---|---|---|---|
| 5,522,029 A | * | 5/1996 | Hatfield | G06F 9/52 710/267 |
| 5,966,387 A | * | 10/1999 | Cloutier | H04N 21/4344 375/E7.278 |
| 6,560,215 B1 | * | 5/2003 | Bloem | H04W 56/0045 370/347 |
| 7,236,739 B2 | | 6/2007 | Chang | |

(Continued)

FOREIGN PATENT DOCUMENTS

JP 2003298630 A 10/2003

OTHER PUBLICATIONS

"International Search Report and Written Opinion Issued in PCT Application No. PCT/US21/023379", dated Jul. 14, 2021, 12 Pages.

(Continued)

*Primary Examiner* — Oleg Survillo
(74) *Attorney, Agent, or Firm* — Holzer Patel Drennan (57) ABSTRACT

Individual clock adjustments between electronic devices are typically based around a round-trip time (RTT) measurement of the reference message between initiating and the receiving devices. With increasing expectations of clock synchronization accuracy, as well as widespread use of wireless data networks, the presently disclosed technology provides a dedicated clock synchronization network that yields a fixed delay between hops and within associated devices of a dedicated clock synchronization network. By accounting for the known delays between hops and within associated devices of the dedicated clock synchronization network, better clock synchronization accuracy can be achieved than prior art techniques that estimate latency based on an RTT measurement.

20 Claims, 8 Drawing Sheets

(56) References Cited

U.S. PATENT DOCUMENTS

| | | | |
|---|---|---|---|
| 8,300,615 B2 | 10/2012 | Copeland et al. | |
| 8,370,754 B2 | 2/2013 | Bull et al. | |
| 8,391,271 B2 | 3/2013 | Mo et al. | |
| 9,374,215 B2 | 6/2016 | Leong et al. | |
| 9,961,094 B1* | 5/2018 | Sanders | H04L 67/535 |
| 2005/0286546 A1 | 12/2005 | Bassoli et al. | |
| 2007/0038999 A1* | 2/2007 | Millington | H04N 5/04 |
| | | | 718/100 |
| 2007/0142944 A1* | 6/2007 | Goldberg | G10H 1/0025 |
| | | | 700/94 |
| 2008/0152165 A1 | 6/2008 | Zacchi | |
| 2010/0017634 A1* | 1/2010 | Chen | G06F 1/3203 |
| | | | 713/400 |
| 2011/0185216 A1* | 7/2011 | Zhao | G06F 1/14 |
| | | | 713/400 |
| 2011/0213278 A1* | 9/2011 | Horak | A61B 5/6823 |
| | | | 600/595 |
| 2011/0214030 A1 | 9/2011 | Greenberg et al. | |
| 2013/0208598 A1* | 8/2013 | Nakaya | H04W 28/0236 |
| | | | 370/237 |
| 2013/0301634 A1 | 11/2013 | Ehlers et al. | |
| 2017/0177527 A1* | 6/2017 | Lovett | G06F 13/364 |
| 2017/0357303 A1* | 12/2017 | Kopetz | H04J 3/0638 |
| 2017/0366287 A1* | 12/2017 | Zeng | H04J 3/0667 |
| 2018/0332548 A1* | 11/2018 | Malekpour | H04W 56/001 |
| 2020/0106542 A1* | 4/2020 | Liu | G06F 1/10 |
| 2021/0051612 A1* | 2/2021 | Bendlin | H04W 56/001 |
| 2021/0337498 A1 | 10/2021 | Lee et al. | |

OTHER PUBLICATIONS

"AmpMe Announces New Desktop Music Sync App", Retrieved from: https://www.businesswire.com/news/home/20181220005530/en/AmpMe-Announces-New-Desktop-Music-Sync-App, Dec. 20, 2018, 2 Pages.

* cited by examiner

CLOCK SYNCHRONIZATION USING WIRELESS SIDE CHANNEL

CROSS-REFERENCE TO RELATED APPLICATIONS

The present application is a continuation of and claims benefit of priority to U.S. patent application Ser. No. 17/007,461, entitled "CLOCK SYNCHRONIZATION USING WIRELESS SIDE CHANNEL" and filed on Aug. 31, 2020, which claims benefit of priority to U.S. Provisional Application No. 63/016,640, entitled "CLOCK SYNCHRONIZATION USING WIRELESS SIDE CHANNEL" and filed on Apr. 28, 2020, the entire disclosure of which is incorporated herein by reference for all purposes.

BACKGROUND

Clock synchronization is used to coordinate otherwise independent clocks in electronic devices. Even when initially set accurately, independent clocks will differ over time due to clock drift, which is caused by the independent clocks counting time at slightly different rates. There are a variety of problems caused by clock differences in electronic devices, as well as a variety of solutions (clock synchronization techniques), each with its own limitations.

For example, in managing time at increasingly smaller scales, problems associated with clock drift take on more complexity in distributed computing in which several computers need to realize the same global time to function properly. Further, clock synchronization is important for accurate reproduction of streaming media, particularly when using multiple input and output devices.

In a system with a central controlling server, the server may dictate the system time in a hub-and-spoke arrangement. Cristian's algorithm and the Berkeley algorithm may be used to resolve clock drift and achieve clock synchronization in this environment. In a distributed system, clock synchronization is more complex as a singular controlling global time is not easily known.

The most used clock synchronization technique used over the Internet is the Network Time Protocol (NTP), which is a layered client-server architecture based on user datagram protocol (UDP) message passing and round-trip time (RTT) measurement thereof. NTP can reduce synchronization offsets to times in the order of a few milliseconds over the public Internet, and to sub-millisecond levels over local area networks. Simple Network Time Protocol (SNTP) and Precision Time Protocol (PTP) are master/slave synchronization protocols used over local area networks and similarly based around RTT measurement of UDP messages or other data packets between the master and the slave devices.

SUMMARY

Implementations described and claimed herein provide a clock synchronization network comprising a master device and a slave device. The master device includes master timing circuitry to generate a master timing reference and a data output to transmit the master timing reference on a dedicated data channel. The slave device includes a data input to receive the master timing reference on the dedicated data channel and slave timing circuitry to synchronize a slave timing reference to the master timing reference using a constant delay over the dedicated data channel.

Implementations described and claimed herein further provide a method for synchronizing a slave device to a master device comprising: generating a master timing reference using master timing circuitry, transmitting the master timing reference from the master device outbound over a dedicated data channel, receiving the master timing reference with a constant delay from the master device to the slave device over the dedicated data channel, and synchronizing a slave timing reference of the slave device to the master timing reference using the constant delay over the dedicated data channel.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTIONS

In a wireless network, managing clock drift becomes even more challenging due to the possibility of collision of synchronization packets on the wireless medium and the higher drift rate of clocks on low-cost wireless devices. The Reference Broadcast Time Synchronization (RBS) algorithm, in which an initiating device broadcasts a reference message to urge receiving devices to adjust their clocks, is used in wireless networks and sensor networks. However, the individual clock adjustments as still based around an RTT measurement of the reference message between the initiating and the receiving devices.

It is difficult for prior art clock synchronization techniques based around the RTT measurement to achieve extremely high precision (e.g., within one time tick (resolution of the clock source), which could be +/−1 microsecond in an implementation that utilizes a 1 Mhz clock source) due to variance of RTT over time, particularly over the Internet or using shared device hardware and/or software.

With increasing expectations of clock synchronization accuracy, as well as widespread use of wireless data networks, the presently disclosed technology provides a dedicated clock synchronization network that yields a fixed delay between hops and within associated devices of a dedicated clock synchronization network. By accounting for the known delays between hops and within associated devices of the dedicated clock synchronization network, better clock synchronization accuracy can be achieved than prior art techniques that estimate latency based on an RTT measurement. Further, synchronization may be achieved in wireless ad hoc networks through sending synchronization messages in a multi-hop manner with each subsequent node progressively synchronizing with the node that is the immediate sender of a synchronization message using an additive delay based on the total number of hops between nodes.

Master/slave is a model of asymmetric communication or control where one device (master device) controls one or more other devices (slave devices) and serves as their communication hub. A master device as described herein provide a master timing to slave devices. Slave devices as described herein receive the master timing reference and adjust their corresponding slave timing references to match.

A variety of computing devices (e.g., laptop computers, personal computers, gaming devices, smart phones, smart TVs, wireless speakers, projectors, and microphones, and other devices that carry out one or more specific sets of arithmetic and/or logical operations) may utilize the clock synchronization networks and signals disclosed in detail herein.

Figure 1:
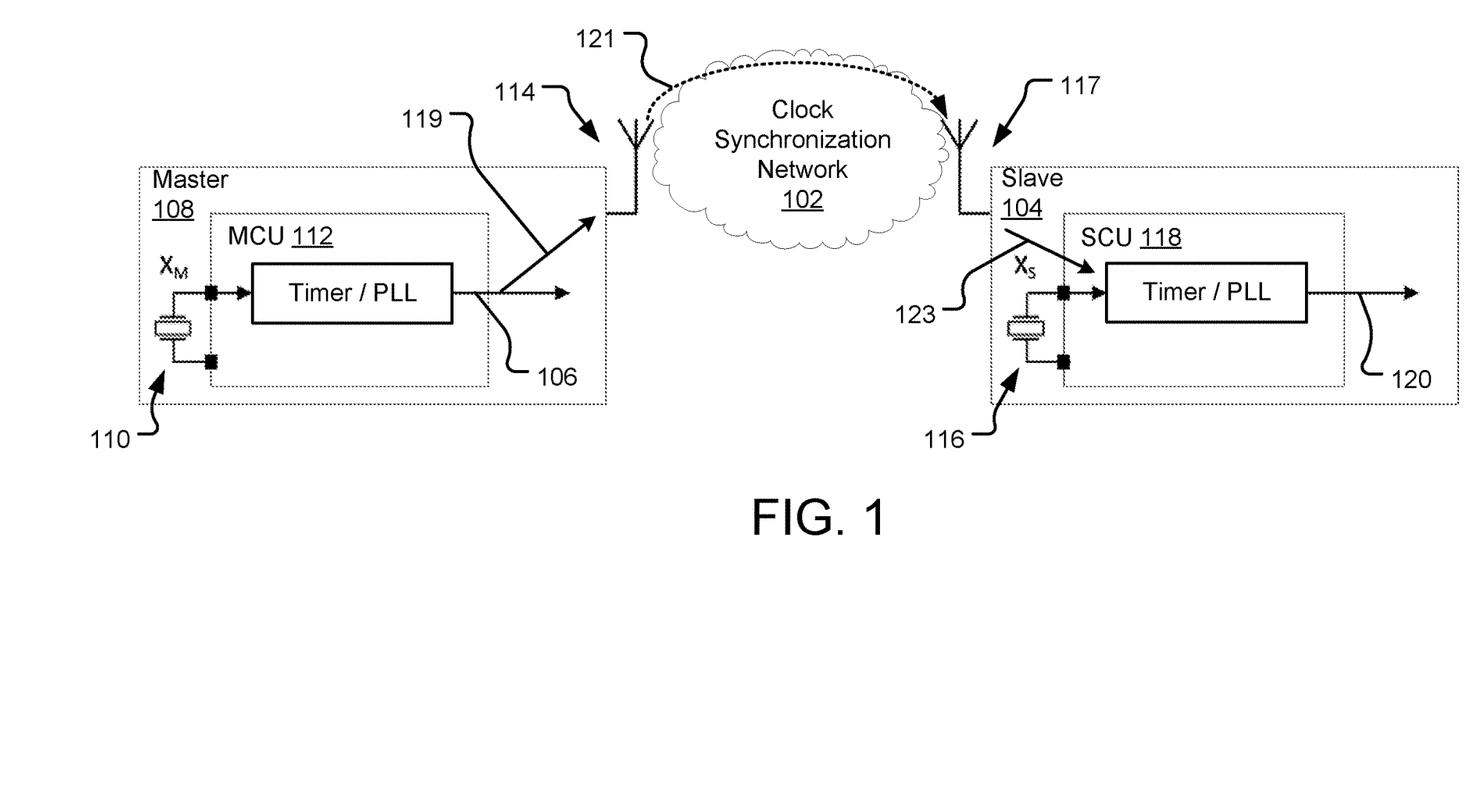
FIG. 1 illustrates an example dedicated wireless clock synchronization network to synchronize a slave device to a timing reference broadcast from a master device.

FIG. 1 illustrates an example dedicated wireless clock synchronization network 102 to synchronize a slave device 104 to a master timing reference 106 broadcast from a master device 108. The master device 108 includes a master timing element (e.g., a crystal oscillator 110 or electronic oscillators such as microcontrollers and phase-locked loop (PLL) circuits), which generates an electrical signal $X_m$ with a precise known frequency. $X_m$ is input into a master control unit 112 (MCU, also referred to herein as master timing circuitry) that includes a software-configurable timer or a phase-locked loop, for example, to generate the master timing reference 106. The master timing reference 106 is output to various components or peripherals of the master device 108 for coordinated operation of the master device 108.

The slave device 104 (and other slave devices connected to the network 102) includes a slave crystal oscillator 116, which generates an electrical signal $X_s$, also with a precise known frequency. The electrical signal $X_s$ is similar to the electrical signal $X_m$ but generated independently from the master crystal oscillator 110 by the slave crystal oscillator 116. $X_s$ is input into a slave control unit 118 (SCU, also referred to herein as slave timing circuitry) that also includes a software-configurable timer or a phase-locked loop, for example, to generate a slave timing reference 120. The slave timing reference 120 is output to various components or peripherals of the slave device 104 for coordinated operation of the slave device 104.

Due to the effects of clock drift, the master timing reference 106 and the slave timing reference 120 may diverge from one another over time. In implementations that require coordinated operation of the master device 108 and the slave device 104, an increasingly unsynchronized timing between the devices 104, 108 is problematic.

The master timing reference 106 may be periodically broadcast via a wireless radio transmitter (or transceiver) and associated antennae 114 into the wireless clock synchronization network 102, via data output 119. In various implementations, the master timing reference 106 may be a timestamp or the slave control unit 118 may recover the master timing reference 106 from an incoming packet rate.

Further, the wireless clock synchronization network 102 utilizes a dedicated data channel 121 for the master timing reference 106 (e.g., a specified frequency band within an existing device-to-device network, or an entirely separate network. Still further, the wireless clock synchronization network 102 may include other components such as access points, proxies, gateways and so on so long as overall latency over the wireless clock synchronization network 102 is constant.

In some implementations, the wireless clock synchronization network 102 may be within a frequency band shared with other device functionality within an existing device-to-device network so long as a guaranteed bandwidth is available within the wireless clock synchronization network 102 when the master timing reference 106 is to be sent out. For example, burst transmissions (e.g., via a time-division multiple access (TDMA) approach) having other functionality within a wireless network may be sent out between periodic transmissions of the master timing reference 106. Further, additional data could be combined with the periodic transmissions of the master timing reference 106 to serve additional functionality. As a result, the wireless clock synchronization network 102 may co-exist on a wireless network used for other purposes.

One or more slave devices (e.g., the slave device 104) are also connected to the wireless clock synchronization network 102 via wireless radio receivers (or transceivers) and associated antennae (e.g., receiver and antennae 117). The wireless clock synchronization network 102 may operate on the dedicated data channel 121 exclusively for clock synchronization or share an existing wireless network with guaranteed bandwidth for the master timing reference 106, as discussed above. In various implementations, the master timing reference 106 may be referenced to an outgoing packet timestamp from the master device 108 (see e.g., FIG. 2), an incoming packet rate to the slave device 104 (see e.g., FIG. 3), or other timing and/or delay reference point. While depicted in FIG. 1 and described as a wireless local area network, in other implementations the clock synchronization network 102 may be a wired local area network. In various implementations, the slave device 104 and the master device 108 are directly connected to the wireless clock synchronization network 102, as shown (also referred to as a direct wireless connection, or a wireless connection).

When the master timing reference 106 is received by the slave device 104 at data input 123, the slave timing reference 120 is adjusted by the slave control unit 118 to match that of the master timing reference 106, including incorporating a predetermined correction factor based on at least the fixed known delay over the dedicated channel operating on the wireless clock synchronization network 102 between the devices 104, 108 and without an RTT measurement specific to the devices 104, 108. This yields the timer/PLL of each of the devices 104, 108 in sync with an extremely high timing synchronization accuracy.

In an example implementation, the crystal oscillators 110, 116 generate electrical signals $X_m$, $X_s$ at 1 megahertz and the associated timing circuitry 112, 118 counts time ticks output from the crystal oscillators 110, 116, which occur every microsecond for a 1 megahertz oscillator. As a result, the dedicated wireless clock synchronization network 102 can achieve extremely high timing synchronization accuracy, which may be within +/−1 microsecond in the context described herein.

Figure 2:
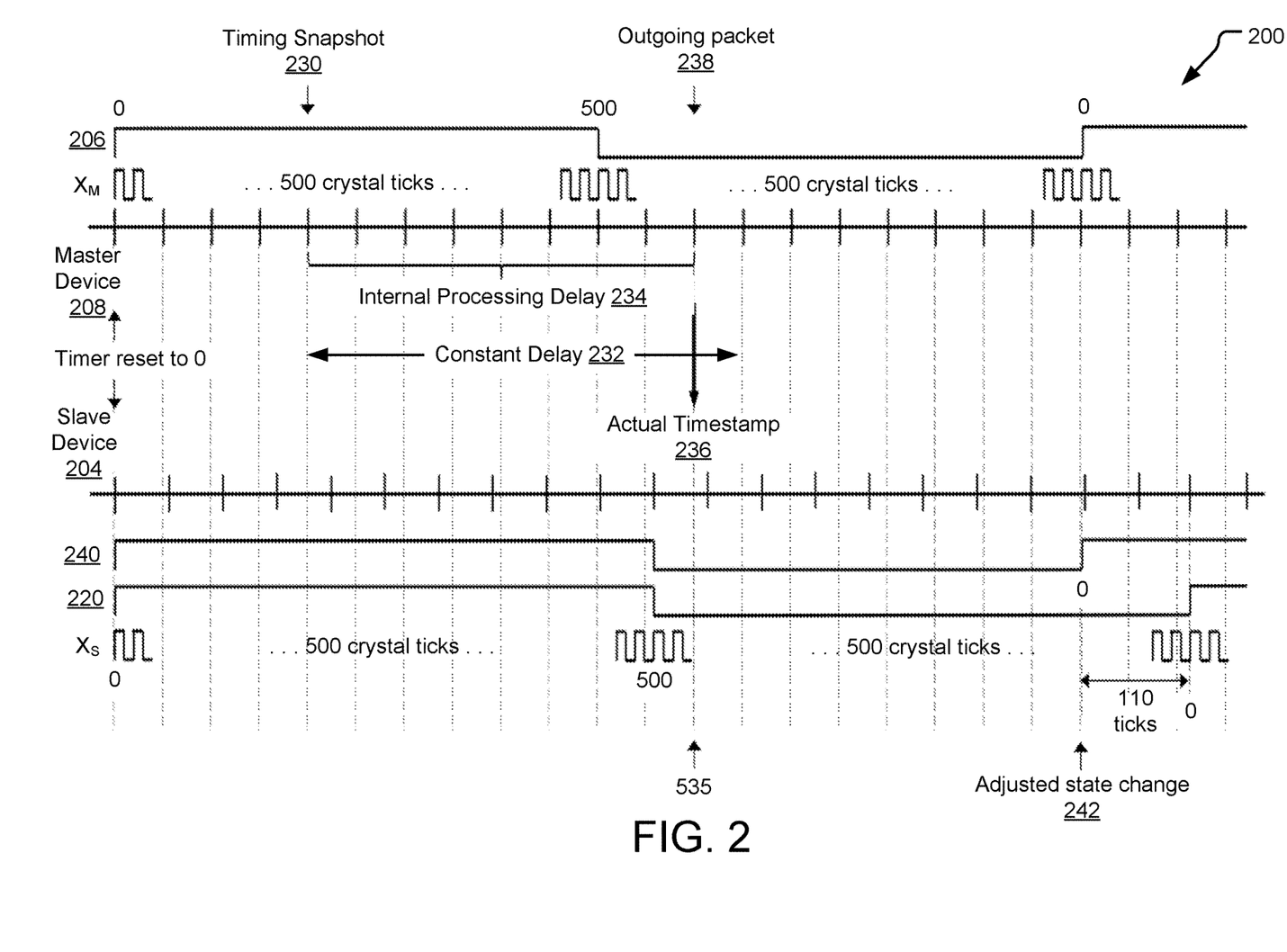
FIG. 2 illustrates an example synchronization timeline for synchronizing a slave device to a timing reference broadcast from a master device using a timestamp.

FIG. 2 illustrates an example synchronization timeline 200 for synchronizing a slave device 204 to a timing reference broadcast from a master device 208 using a timestamp. The master device 208 includes a master crystal oscillator, which generates an electrical signal $X_m$ with a precise known frequency. $X_m$ is input into a master control unit to generate a master timing reference 206. The master timing reference 206 is output to various components or peripherals of the master device 208 for coordinated operation of the master device 208.

Similarly, the slave device 204 includes a slave crystal oscillator, which generates an electrical signal $X_s$ with a precise known frequency. Electrical signal $X_s$ is similar to electrical signal $X_m$ but generated independently from the master crystal oscillator by the slave crystal oscillator. $X_s$ is input into a slave control unit to generate a slave timing reference 220. The slave timing reference 220 is output to various components or peripherals of the slave device 204 for coordinated operation of the slave device 204.

For purposes of illustration, the master and slave crystal oscillators are running at 1 MHz. 1 kHz timer outputs based on the master and slave crystal oscillators are treated as the master timing reference 206 and the slave timing reference 220, respectively. Each of the 1 kHz timers of the timing references 206, 220 register a state change every 500 crystal ticks. The master and slave timing references 206, 220 are synchronized when their respective timers are reset to 0, but due to manufacturing and environmental variances, the master and slave timing references 206, 220 may diverge over time (e.g., though designed to operate at 1.00 Mhz, the slave crystal oscillator may actually operate at 1.01 MHz).

In this example, the master control unit includes a timing snapshot capture function (and associated module) that captures a timing snapshot 230 of the master timing reference 206 at a predetermined value (here, 200 crystal ticks). The timing snapshot 230 includes at least a crystal tick value but may also include additional information relevant to the master device 208 and/or the slave device 204. While the timing snapshot 230 occurs at 200 crystal ticks, in other implementations, the timing snapshot 230 may occur at any number of crystal ticks and at any predetermined frequency (e.g., every 100 crystal ticks or every 2000 crystal ticks), which is application-dependent (e.g., what level of precision is desired and at what rate to the master and slave timing references 206, 220 diverge).

The captured timing snapshot 230 at 200 crystal ticks is transmitted to the slave device 204 over a dedicated clock synchronization channel for use in adjusting the slave timing reference 220 to match the master timing reference 206. This includes incorporating a predetermined correction factor or constant delay 232 (here, 445 crystal ticks) based on at least a fixed known delay of the dedicated channel operating on the clock synchronization network between the devices 204, 208, but without an RTT measurement specific to the devices 204, 208. In various implementations, the constant delay 232 may be set at the factory and saved to the slave device 204 or pre-set in the field at the slave device 204 for the specific pairing of the master device 208 and the slave device 204.

In this example, the constant delay 232 is calculated as a combination of an internal processing delay 234 at the master device 208 (e.g., a time required to process the timing snapshot 230 and send it outbound to the dedicated clock synchronization channel as outgoing packet 238) equal to 400 crystal ticks. Further, an additional 45 crystal ticks are added to compensate for the transit time between the master device 208 and the slave device 204 over the dedicated clock synchronization channel and time required for the slave device 204 to receive and timestamp the incoming captured timing snapshot 230. The constant delay 232 is predetermined and pre-tested to remain constant for the time required for a captured timing snapshot 230 to be received by the slave device 204 and is known by the slave device 204 to perform a timing adjustment. In some implementations, the constant delay 232 is known only to the master device 208 and is transmitted as part of the captured timing snapshot 230. In other implementations, the constant delay 232 is also known by the slave device 204 and is not necessarily transmitted with the captured timing snapshot 230.

In this example, the slave device 204 receives the captured timing snapshot 230 known to be captured at 200 crystal ticks at the master device 208. The slave device 204 also knows that its timestamp on receipt of the captured timing snapshot should equal 645 crystal ticks (capture timer value: 200+constant delay: 445). The slave device 204 compares the expected timestamp on receipt of the captured timing snapshot (645 crystal ticks) with the actual timestamp 236 of receipt of the captured timing snapshot (here, 535 crystal ticks), resulting in a clock drift error of 110 crystal ticks. The slave control unit within the slave device 204 then directs the slave timing reference 220 to toggle its next state change 110 crystal ticks earlier than it would otherwise (e.g., at adjusted state change 242, which is 890 crystal ticks=1000−(200+445−535)), which yields an adjusted slave timing reference 240 that is synchronized to the captured timing snapshot of the master device 208. In the illustrated case of a 1 kHz slave timing reference 220, the adjusted slave timing reference 240 is reset to 0 crystal ticks at 890 rather than 1000 crystal ticks.

Following the reset of the slave timing reference 220 to adjusted slave timing reference 240, the adjusted slave timing reference 240 will start to drift again yielding a time disparity that is resolved by periodic subsequent captured timing snapshots at a sufficiently high packet rate. In other implementations, the subsequent captured timing snapshots are not periodic. For example, the subsequent captured timing snapshots could be pseudorandom or defined by available bandwidth on the master device 208 and/or the clock synchronization network. The timing of subsequent captured timing snapshots may also be based on a detected error rate, an application state on the master device 208, or other considerations. These are repeatedly used to adjust the slave timing reference to maintain synchronization with the master device 208 (e.g., to prevent the time disparity from exceeding a tolerance specific to the application). In some implementations, the tolerance is used to determine a captured timing snapshot rate.

In various implementations, the features of FIG. 2 offer specific technical performance benefits to the disclosed timing synchronization systems and methods. Specifically, the timing snapshot 230 permits a periodic reset of the slave timing reference 220 to the adjusted slave timing reference 240, and at a regular or irregular rate that maintains synchronization with the master device 208 within a tolerance specific to the application. The predetermined correction factor (also referred to herein as constant delay 232) is predetermined and pre-tested to remain constant for the time required for a captured timing snapshot 230 to be received by the slave device 204 and is known by the slave device 204 to perform a timing adjustment. The predetermined correction factor is used in place of an RTT measurement, which has various disadvantages as discussed above. The predetermined correction factor includes a constant delay based on at least a fixed known delay of the dedicated channel operating on the clock synchronization network between the devices 204, 208, including but not limited to processing within the devices 204, 208 and a delay over the clock synchronization channel, but without an RTT measurement specific to the devices 204, 208.

Figure 3:
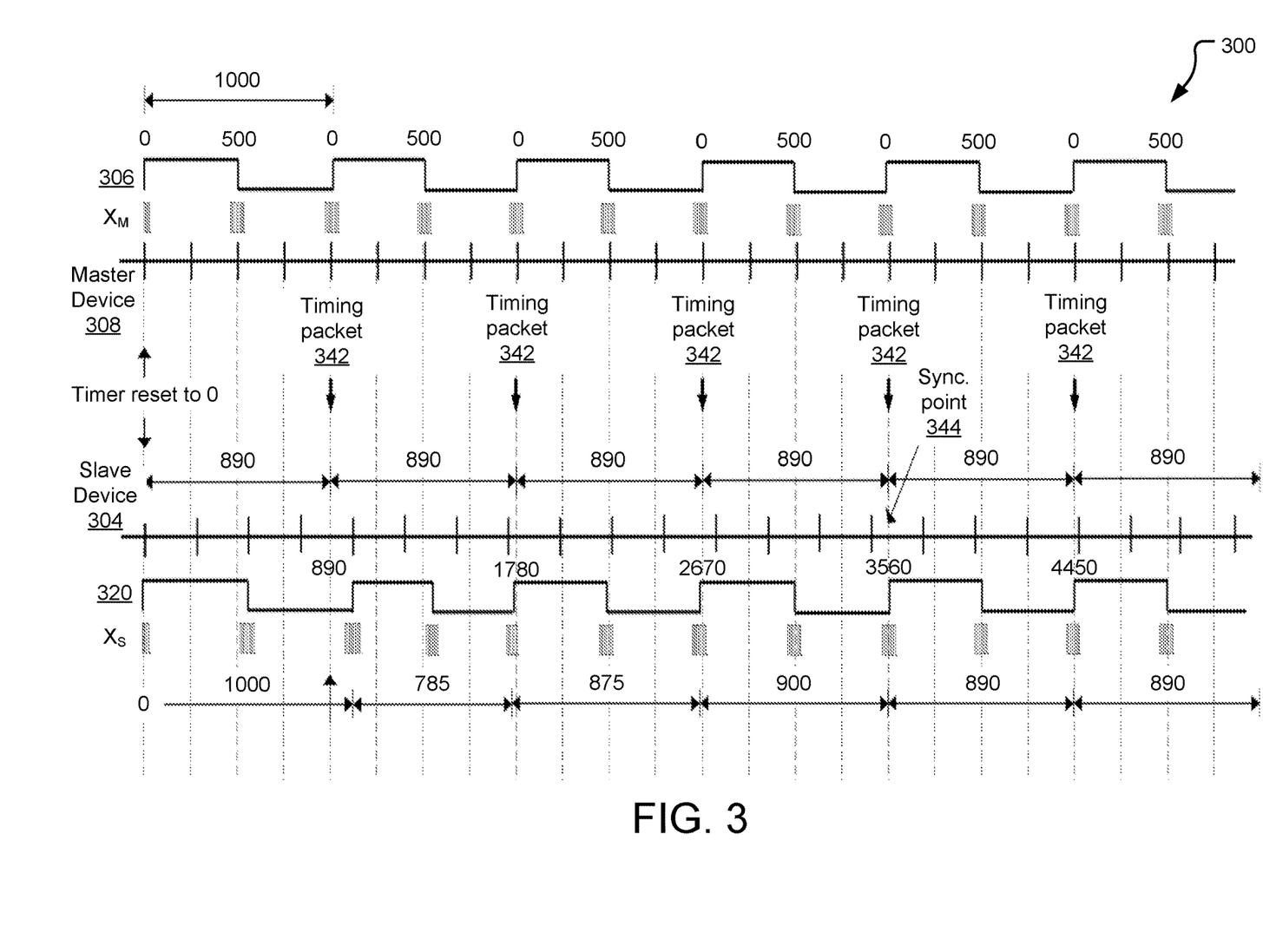
FIG. 3 illustrates another example synchronization timeline for synchronizing a slave device to a timing reference periodically broadcast from a master device at a known packet rate.

FIG. 3 illustrates another example synchronization timeline 300 for synchronizing a slave device 304 to a timing reference 306 (in the form of outgoing timing packets 342) periodically broadcast from a master device 308 at a predetermined packet rate. The master device 308 includes a master crystal oscillator, which generates an electrical signal $X_m$ with a precise known frequency. $X_m$ is input into a master control unit to generate the master timing reference 306. The master timing reference 306 is output to various components or peripherals of the master device 308 for coordinated operation of the master device 308.

Similarly, the slave device 304 includes a slave crystal oscillator, which generates an electrical signal $X_s$ with a precise known frequency. Electrical signal $X_s$ is similar to electrical signal $X_m$ but generated independently from the master crystal oscillator by the slave crystal oscillator. $X_s$ is input into a slave control unit to generate a slave timing reference 320. The slave timing reference 320 is output to various components or peripherals of the slave device 304 for coordinated operation of the slave device 304.

For purposes of illustration, the master and slave crystal oscillators are running at 1 MHz. 1 kHz timer outputs based on the master and slave crystal oscillators are treated as the master timing reference 306 and the slave timing reference 320, respectively. Each of the 1 kHz timers of the timing references 306, 320 register a state change every 500 crystal ticks. The master and slave timing references 306, 320 are synchronized when their respective timers are reset to 0, but due to manufacturing and environmental variances, the master and slave timing references 306, 320 may diverge over time (e.g., though designed to operate at 1.00 Mhz, the slave crystal oscillator may actually operate at 1.01 MHz).

The master control unit includes an outgoing packet transmission feature that sends the outgoing timing packets 342 over a dedicated clock synchronization channel for use in adjusting the slave timing reference 320 to match the master timing reference 306. The outgoing timing packets 342 are sent at a known (to at least the slave device 304) packet rate (here, every 1000 crystal ticks), however, the packet rate can be at any predetermined frequency (e.g., every 500 crystal ticks or every 2000 crystal ticks, for example), which is application-dependent (e.g., depending upon what level of precision is desired and at what rate the master and slave timing references diverge). In various implementations, some of the outgoing timing packets 342 are lost during transmission. Some packet losses can be tolerated by not applying a correction when a packet gets lost.

The slave control unit within the slave device 304 includes a timing feedback control module (e.g., a proportional-integral-derivative (PID) controller) that compares measured crystal ticks between received timing packets 342 to the known packet rate of the timing reference 306. The slave control unit then adjusts the slave timing reference 320 to match that of the outgoing timing packets 342 over time. For example, as shown in FIG. 3, the outgoing timing reference 306 packet rate is set at 1000 crystal ticks. However, the first outgoing timing packet 342 is received at 890 crystal ticks at the slave device 304. If 890 of 1000 crystal ticks is outside an acceptable synchronization tolerance between the devices 304, 308, this triggers the slave control unit to run a synchronization algorithm to adjust the slave timing reference 320 over time.

Specifically, the timing feedback control module adjusts its next 1000 crystal ticks to restart at 785 rather than 1000 to compensate for the accumulated clock drift and expected future clock drift. Subsequent timing packets 342 direct the timing feedback control module to adjust its next three 1000 crystal tick periods to restart at 875, 900, and 890, sequentially to iteratively synchronize the slave timing reference 320 to the master timing reference 306. At synchronization point 344, the slave timing reference 320 is synchronized to the master timing reference 306 and subsequent crystal tick periods to restart at 890 until synchronization between the devices 304, 308 again falls outside an acceptable synchronization tolerance. This again triggers the slave control unit to run the synchronization algorithm to again adjust the slave timing reference 320 over time.

To the extent that the slave timing reference 320 remains synchronized to the master timing reference 306, following 1000 crystal tick periods restart at 890 for the slave timing reference 320 to adjust for expected future clock drift only. The timing packets 342 are repeatedly used to adjust the slave timing reference 320 to maintain synchronization with the master timing reference 306 to prevent the time disparity from exceeding the tolerance specific to the application. This tolerance is predetermined to yield the captured timing snapshot rate.

While synchronized in frequency, the master timing reference 306 and the slave timing reference 320 may not be edge aligned, which indicates that they are out of phase following the aforementioned packet rate adjustment at the slave device 304. To achieve approximate edge alignment, the slave device 304 may utilize the moment of packet reception to edge-align with the master timing reference 306, optionally accounting for a known fixed transmission delay.

FIGS. 2 and 3 are not drawn to scale. Clock drift may be exaggerated from that which would likely occur in practice to illustrate the technical solution. In various implementations, the outgoing packet 238 of FIG. 2, and subsequent output packets, as well as the timing packets 342 of FIG. 3 are sent out via a dedicated data channel. The dedicated data channel permits latency of receipt of the packets to be relatively constant, which allows the present application to perform timing adjustments without an RTT measurement.

Figure 4:
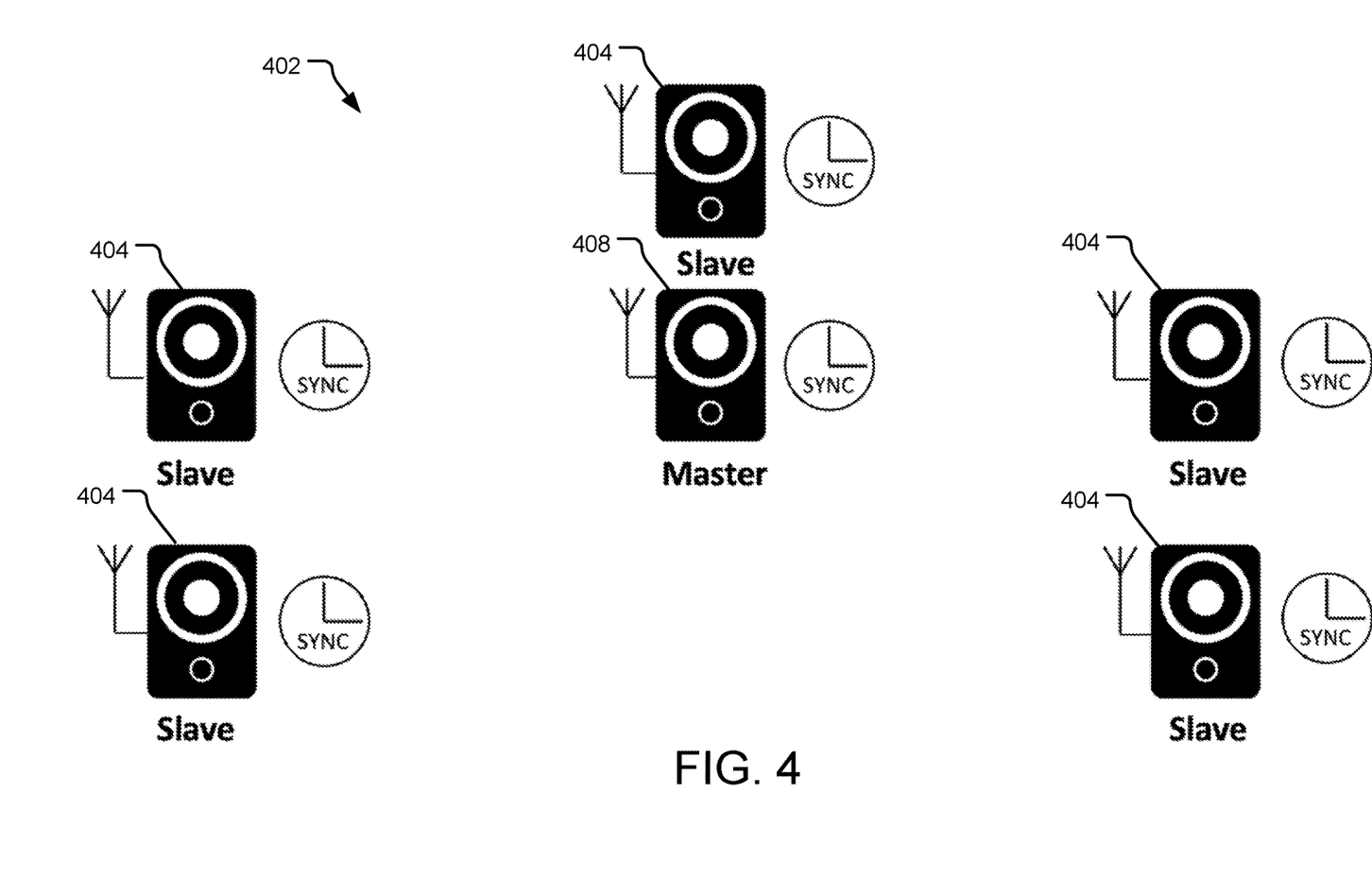
FIG. 4 illustrates a dedicated wireless clock synchronization network of slave speakers synchronized to a master speaker.

FIG. 4 illustrates a dedicated wireless clock synchronization network 402 of slave speakers 404 synchronized to a master speaker 408. In an example implementation, the speakers 404, 408 form a fully synchronized multi-channel surround wireless speaker system. The master speaker 408 generates a master timing reference and the slave speakers 404 similarly generate slave timing references. Due to the effects of clock drift, the master timing reference and the slave timing references will diverge from one another over time. In implementations that require coordinated operation of the master speaker 408 and the slave speakers 404, such as synchronized audio output, an increasingly unsynchronized timing between the speakers 404, 408 is problematic.

The master timing reference is periodically broadcast via a wireless radio transmitter and associated antennae into the wireless clock synchronization network 402. The slave speakers 404 are also connected to the wireless clock synchronization network 402 via wireless radio receivers and associated antennae (or transceivers). The wireless clock synchronization network 402 may operate on a dedicated channel exclusively for clock synchronization. In other implementations, the wireless clock synchronization network 402 may share an existing wireless network with guaranteed bandwidth for the master timing reference. In various implementations, the master timing reference may be referenced to an outgoing packet timestamp from the master speaker 408 (see e.g., FIG. 2), an incoming packet rate to the slave speakers 404 (see e.g., FIG. 3) or other timing reference point. While depicted in FIG. 4 and described as a wireless local area network, in other implementations the clock synchronization network 402 may be a wired local area network.

When the master timing reference is received by the slave speakers 404, the slave timing references are adjusted to match that of the master timing reference, including incorporating a predetermined correction factor based on at least the fixed known delay of the dedicated channel operating on the wireless clock synchronization network 402 between the speakers 404, 408 and without an RTT measurement specific to the speakers 404, 408.

Figure 5:
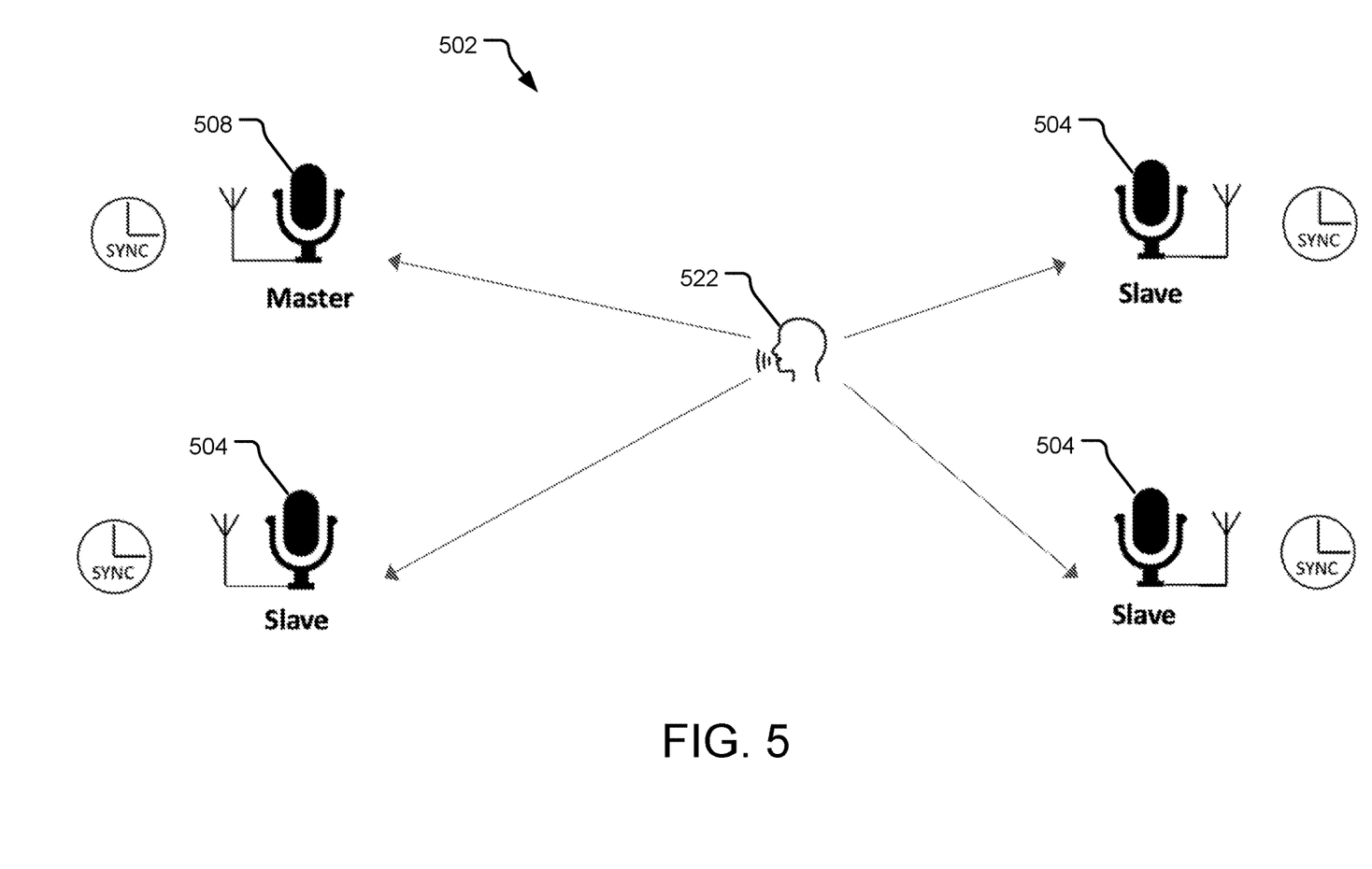
FIG. 5 illustrates a dedicated wireless clock synchronization network of slave microphones synchronized to a master microphone.

FIG. 5 illustrates a dedicated wireless clock synchronization network 502 of slave microphones 504 synchronized to a master microphone 508. In an example implementation, the microphones 504, 508 form a fully synchronized array of microphones to capture audio from a user 522. In some implementations, the microphones 504, 508 utilize sound source localization (SSL) to estimate the location of the user 522 using relative time delay of sound arriving at each of the microphones 504, 508. The more accurate clock synchronization of the microphones 504, 508, the more accurate the SSL can be.

The master microphone 508 generates a master timing reference and the slave microphones 504 similarly generate slave timing references. Due to the effects of clock drift, the master timing reference and the slave timing references will diverge from one another over time. In implementations that require coordinated operation of the master microphone 508 and the slave microphones 504, such as synchronized audio input, an increasingly unsynchronized timing between the microphones 504, 508 is problematic.

The master timing reference is periodically broadcast via a wireless radio transmitter and associated antennae into the wireless clock synchronization network 502. The slave microphones 504 are also connected to the wireless clock synchronization network 502 via wireless radio receivers and associated antennae (or transceivers). The wireless clock synchronization network 502 may operate on a dedicated channel exclusively for clock synchronization. In other implementations, the wireless clock synchronization network 502 may share an existing wireless network with guaranteed bandwidth for the master timing reference. In various implementations, the master timing reference may be referenced to an outgoing packet timestamp from the master microphone 508 (see e.g., FIG. 2), an incoming packet rate to the slave microphones 504 (see e.g., FIG. 3) or other timing reference point. While depicted in FIG. 5 and described as a wireless local area network, in other implementations the clock synchronization network 502 may be a wired local area network.

When the master timing reference is received by the slave microphones 504, the slave timing references are adjusted to match that of the master timing reference, including incorporating a predetermined correction factor based on at least the fixed known delay of the dedicated channel operating on the wireless clock synchronization network 502 between the microphones 504, 508 and without an RTT measurement specific to the microphones 504, 508.

Figure 6:
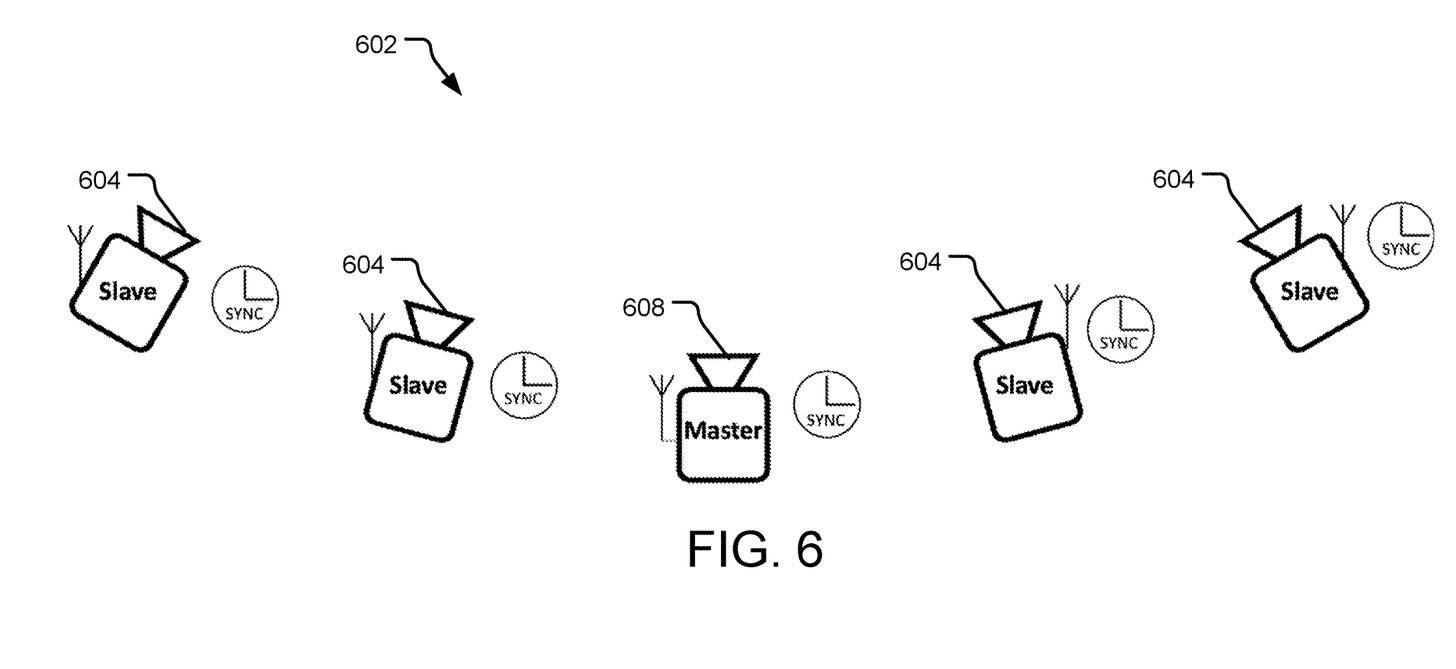
FIG. 6 illustrates a dedicated wireless clock synchronization network of slave cameras synchronized to a master camera.

FIG. 6 illustrates a dedicated wireless clock synchronization network 602 of slave cameras 604 synchronized to a master camera 608. In an example implementation, the cameras 604, 608 form fully synchronized streams from the independently recording cameras 604, 608. In some implementations, the cameras 604, 608 are used to output seamless camera feed transitions, seamless image stitching, and/or depth sensing, each of which operates more seamlessly with a more accurate clock synchronization of the cameras 604, 608.

The master camera 608 generates a master timing reference and the slave cameras 604 similarly generate slave timing references. Due to the effects of clock drift, the master timing reference and the slave timing references will diverge from one another over time. In implementations that require coordinated operation of the master camera 608 and the slave cameras 604, such as synchronized video output, an increasingly unsynchronized timing between the cameras 604, 608 is problematic.

The master timing reference is periodically broadcast via a wireless radio transmitter and associated antennae into the wireless clock synchronization network 602. The slave cameras 604 are also connected to the wireless clock synchronization network 602 via wireless radio receivers and associated antennae (or transceivers). The wireless clock synchronization network 602 may operate on a dedicated channel exclusively for clock synchronization. In other implementations, the wireless clock synchronization network 602 may share an existing wireless network with guaranteed bandwidth for the master timing reference. In various implementations, the master timing reference may be referenced to an outgoing packet timestamp from the master camera 608 (see e.g., FIG. 2), an incoming packet rate to the slave cameras 604 (see e.g., FIG. 3) or other timing reference point. While depicted in FIG. 6 and described as a wireless local area network, in other implementations the clock synchronization network 602 may be a wired local area network.

When the master timing reference is received by the slave cameras 604, the slave timing references are adjusted to match that of the master timing reference, including incorporating a predetermined correction factor based on at least the fixed known delay of the dedicated channel operating on the wireless clock synchronization network 602 between the cameras 604, 608 and without an RTT measurement specific to the cameras 604, 608.

The presently disclosed technology is applicable to a variety of audio and/or video input and/or output devices, as provided in FIGS. 3-6 and detailed descriptions thereof. The presently disclosed technology may further be applicable to a variety of devices outside of the audio and/or video context. For example, distributed computing applications often require a high level of synchronization between computing devices. Further, in testing or manufacturing environments with multiple sensors and complex feedback control mechanisms, a high sampling rate and synchronization within the time space may be required to coordinate sensor results within a rapidly changing system (e.g., in autonomous cars, industrial automation and control systems, aviation systems, smart homes, surveillance systems, and so on). More generally, any application that requires a particularly high sampling rate and/or synchronization within the time space may benefit from the presently disclosed technology.

The presently disclosed technology may utilize a dedicated communication channel, along with dedicated processing power to achieve a substantially fixed latency without an RTT measurement. In various implementations, the dedicated communication channel and dedicated processing power are implemented in exclusively hardware and/or firmware. Further, software may be used to reserve processing power and/or bandwidth within shared hardware resources to achieve a similarly substantially fixed latency without dedicated separate hardware resources and without the RTT measurement.

The presently disclosed technology may use a programmable logic block that interconnects independent peripherals with a fixed latency. Example representative programmable logic devices are field programmable gate arrays (FPGAs) and complex programmable logic devices (CPLDs). Synthesis of the hardware logic block may mandate prescribed timing behavior, which ensures the fixed latency by design. Further, some microcontroller architectures support autonomous peripheral operation that mimic the operation of FPGAs and CPLDs, which could be used to implement the presently disclosed technology. Hardwiring the events and tasks of independent internal peripherals can achieve minimized latency. Once configured at bootup, an event generated by a peripheral can autonomously trigger another peripheral with a fixed latency without the intervention of any processing elements.

In various implementations, the dedicated wireless side channel described herein may be implemented using already-present radios in master and slave devices so long as the radios support a constant-time implementation and have the capability of sharing existing radio resources for the clock synchronization. For example, Wi-Fi chipsets and communication stacks may support ad hoc network construction, and Bluetooth chipsets and communication stacks may render full control over the radios and other restricted peripherals to a user.

The dedicated wireless side channel described herein may be extended to multi-hop dedicated networks at the expense of accumulating error per each hop (e.g., a 5-hop network may have an approximately five time tick precision). Multi-hop networks may employ a broadcast-based managed flooding technique, wherein each retransmission subtracts a constant retransmission processing delay from the timestamp before relaying. For example, an indicator may be embedded within the master timing reference to indicate the number of hops taken, and perhaps a maximum number of hops (e.g., via a countdown from the maximum).

Figure 7:
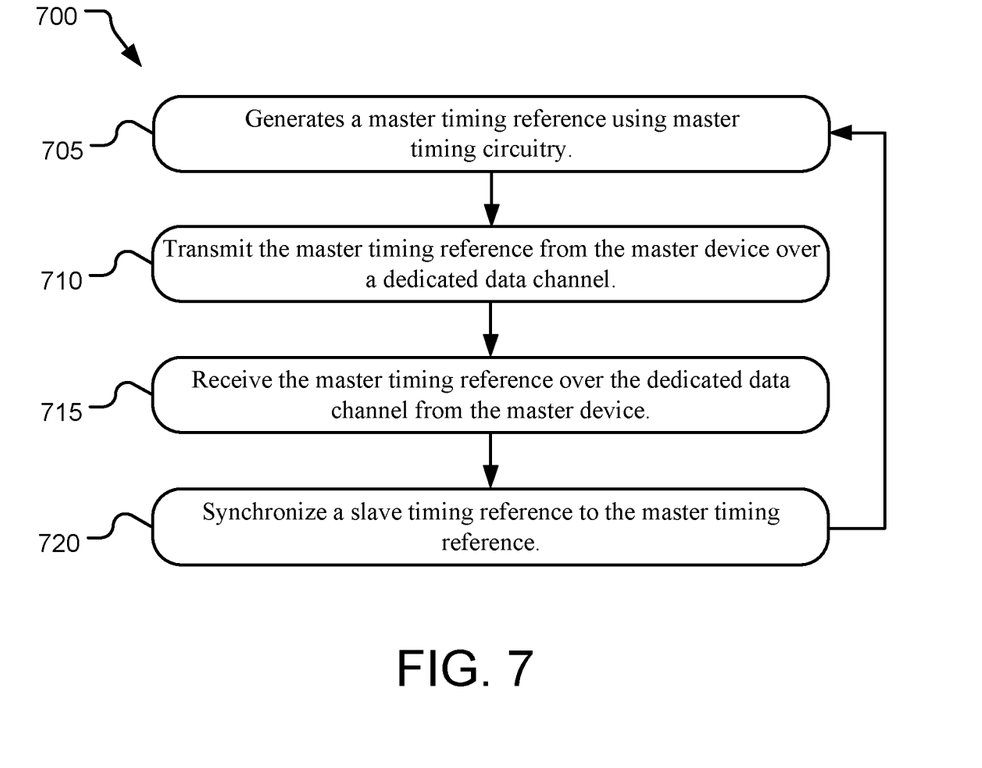
FIG. 7 illustrates example operations for synchronizing a slave device to a master device.

FIG. 7 illustrates example operations 700 for synchronizing a slave device to a master device. A generating operation 705 generates a master timing reference using master timing circuitry. A transmitting operation 710 transmits the master timing reference from the master device to a dedicated data channel. In some implementations, the dedicated data channel is a wireless data channel and transmitted using a wireless radio transmitter.

A receiving operation 715 receives the master timing reference over the dedicated data channel from the master device. In some implementations, the dedicated data channel is a wireless data channel and received using a wireless radio receiver. The received master timing reference has a fixed known delay which is caused by delays within one or more of the master device, the dedicated data channel, and the slave device.

A synchronizing operation 720 synchronizes a slave timing reference to the master timing reference using a correction factor based on the fixed known delay. In some implementations, the synchronizing operation 720 uses a snapshot of the master timing reference and a predetermined delay for a data packet containing the timing snapshot to be transmitted between the master device and the slave device. In other implementations, the synchronizing operation 720 uses a known packet rate of a series of incoming packets from the master device containing the master timing reference. The operations 700 may iteratively and automatically repeat to continuously synchronize the slave device to the master device.

Figure 8:
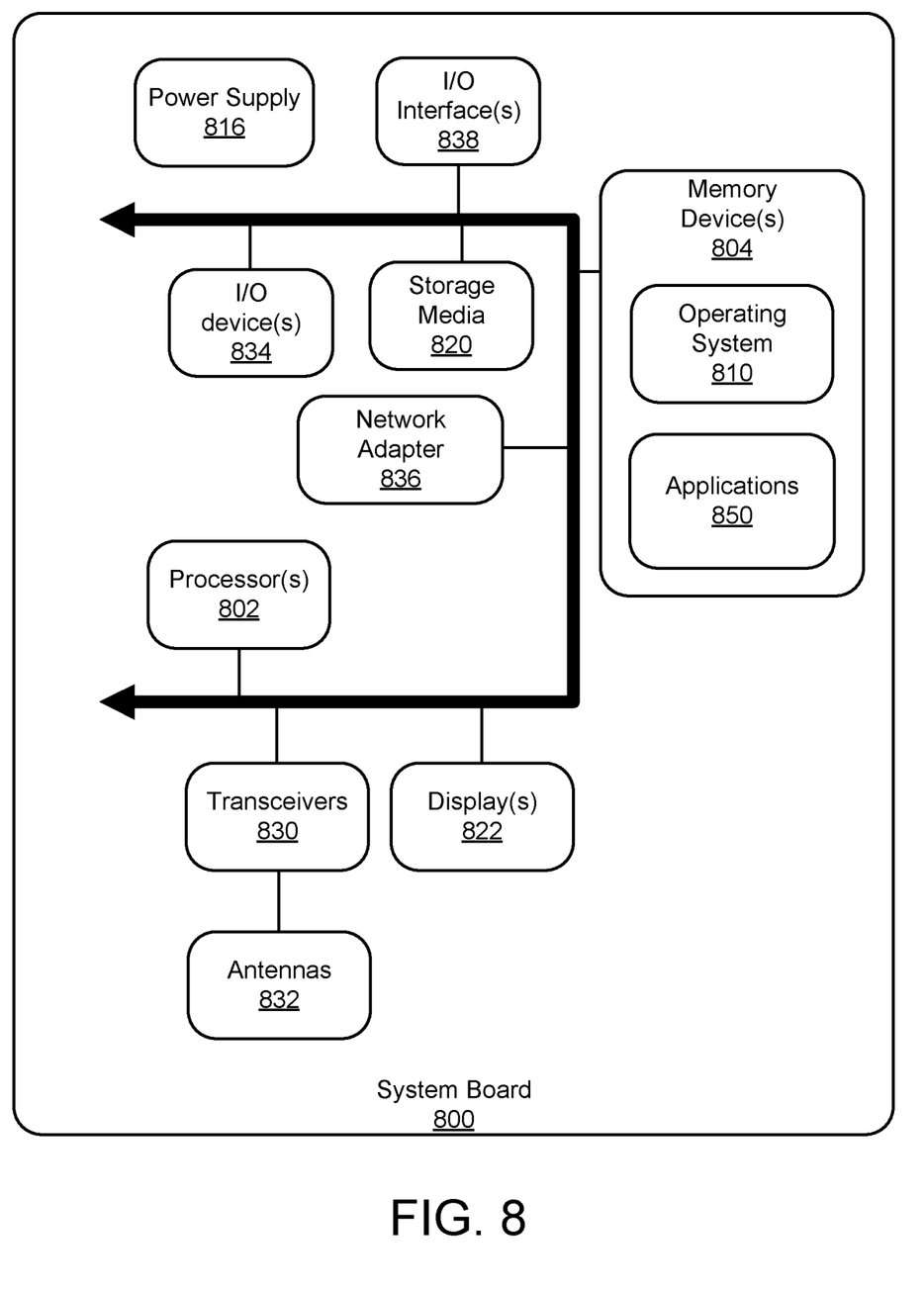
FIG. 8 illustrates example hardware and software that can be useful in implementing the described technology.

FIG. 8 illustrates example hardware and software that can be useful in implementing the described technology. The master and/or slave devices disclosed herein may be remote control devices and/or physically controlled devices and are network-connected and/or network-capable devices and may be client devices, such as laptops, mobile devices, desktops, tablets, server/cloud devices an internet-of-things devices; electronic accessories, or other electronic devices, for example.

The master and/or slave devices disclosed herein may each include a system board 800, upon which a variety of microelectronic components for the device are attached and interconnected. For example, the system board 800 may include one or more processors 802 (e.g., discrete or integrated microelectronic chips and/or separate but integrated processor cores, including but not limited to central processing units (CPUs) and graphic processing units (GPUs)) and at least one memory device 804, which may be integrated into systems or chips of the device. The master and/or slave devices may also include storage media 820 (e.g., a flash or hard disk drive), one or more display(s) 822, and other input/output (I/O) devices 834. The input/output (I/O) devices 834 may permit a user to may enter commands and information (e.g., via a keyboard or mouse). These and other input devices may be coupled to the server by one or more I/O interfaces 838, such as a serial port interface, parallel port, and/or universal serial bus (USB).

The memory device(s) 804 and/or the storage media 820 may include one or both of volatile memory (e.g., random-access memory (RAM)) and non-volatile memory (e.g., flash memory or magnetic storage). An operating system 810, such as one of the varieties of the Microsoft Windows® operating system, resides in the memory device(s) 804 and/or the storage media 820 and is executed by at least one of the processor(s) 802, although other operating systems may be employed. One or more additional applications 850 are loaded in the memory device(s) 804 and/or the storage media 820 and executed within the operating system 810 by at least one of the processor(s) 802.

The system board 800 may further include a (or be connected to an external) power supply 816, which is powered by one or more batteries or other power sources and provides power to the system board 800 and an associated master and/or slave device. The power supply 816 may also be connected to an external power source that overrides or recharges the batteries.

The system board 800 may further include one or more communication transceivers 830, which may be connected to one or more antenna(s) 832 to provide network connectivity (e.g., mobile phone network, Wi-Fi®, Bluetooth®) to one or more other servers and/or client devices (e.g., mobile devices, desktop computers, or laptop computers). The system board 800 may further include a network adapter 836, which is a type of communication interface. The system board 800 may use the network adapter 836 and any other types of communication devices for establishing connections over a wide-area network (WAN) or local-area network (LAN). The master and/or slave devices described herein may each include a communication transceiver 830 connected to an antenna 832 to send and/or receive a master timing signal over a dedicated wireless side channel. The network connections shown are exemplary and that other communication devices and means for establishing a communications links between master and/or slave devices may be used.

The master and/or slave devices may include a variety of tangible computer-readable storage media (e.g., the memory device(s) and the storage media device(s)) and intangible computer-readable communication signals. Tangible computer-readable storage can be embodied by any available media that can be accessed by the master and/or slave devices and includes both volatile and non-volatile storage media, as well as removable and non-removable storage media implemented in any method or technology for storage of information such as computer readable instructions, data structures, program modules or other data. Tangible computer-readable storage media includes, but is not limited to, RAM, read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other tangible medium which can be used to store the desired information and which can be accessed by the master and/or slave devices. Tangible computer-readable storage media excludes intangible communications signals.

Intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared (IR), and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

Some embodiments of the invention described herein are implemented as logical steps in one or more computer systems. The logical operations are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations described herein are referred to variously as operations, steps, objects, or modules. Furthermore, the logical operations may be performed in any order, adding or omitting operations as desired, unless explicitly claimed otherwise or a specific order is inherently necessitated by the claim language.

An example clock synchronization network according to the presently disclosed technology comprises a master device and a slave device. The master device includes master timing circuitry to generate a master timing reference and a data output to transmit the master timing reference on a dedicated data channel. The slave device includes a data input to receive the master timing reference on the dedicated data channel and slave timing circuitry to synchronize a slave timing reference to the master timing reference using a predetermined delay over the dedicated data channel.

In another example clock synchronization network according to the presently disclosed technology, the slave timing circuitry synchronizes the slave timing reference to the master timing reference using a snapshot of the master timing reference and a predetermined delay for a data packet containing the snapshot to be transmitted between the master device and the slave device.

In another example clock synchronization network according to the presently disclosed technology, the slave timing circuitry synchronizes the slave timing reference to the master timing reference using a known packet rate of a series of incoming packets from the master device containing the master timing reference.

In another example clock synchronization network according to the presently disclosed technology, the master timing circuitry includes an oscillator that serves as a reference for a timer that generates the master timing reference.

In another example clock synchronization network according to the presently disclosed technology, the slave timing circuitry includes an oscillator that serves as a reference for a timer that generates the slave timing reference, and wherein the slave timing circuitry is to synchronize the slave timing reference by adjusting an oscillator count for toggling the slave timing reference.

In another example clock synchronization network according to the presently disclosed technology, the predetermined delay includes delays at one or more of: the master device, the slave device, and the dedicated data channel.

In another example clock synchronization network according to the presently disclosed technology, the slave timing reference is synchronized to the master timing reference without a round-trip time (RTT) measurement.

In another example clock synchronization network according to the presently disclosed technology, the dedicated data channel is a direct wireless connection between the master device and the slave device.

In another example clock synchronization network according to the presently disclosed technology, the dedicated data channel is a wired connection between the master device and the slave device.

Another example clock synchronization network according to the presently disclosed technology further comprises a second slave device. The second slave device includes a data input to receive the master timing reference on the dedicated data channel from the slave device and slave timing circuitry to synchronize a second slave timing reference to the master timing reference with a correction factor based on the predetermined delay over the dedicated data channel and a number of hops from the master device to the second slave device.

In another example clock synchronization network according to the presently disclosed technology, the master device is a component of an autonomous car and the slave device is a sensor on the autonomous car.

In another example clock synchronization network according to the presently disclosed technology, the master device and the slave device are each one or both of audio and video devices.

In another example clock synchronization network according to the presently disclosed technology, precision of synchronization of the slave timing reference to the master timing reference is within one time tick.

In another example clock synchronization network according to the presently disclosed technology, the master timing reference is generated by an application executing on the master device.

In another example clock synchronization network according to the presently disclosed technology, the master timing reference is generated at a rate that is based on a desired precision of an application executing on the slave device.

An example method for synchronizing a slave device to a master device according to the presently disclosed technology comprises generating a master timing reference using master timing circuitry, transmitting the master timing reference from the master device outbound over a dedicated data channel, receiving the master timing reference with a predetermined delay from the master device to the slave device over the dedicated data channel, and synchronizing a slave timing reference of the slave device to the master timing reference using the predetermined delay over the dedicated data channel.

In another example method for synchronizing a slave device to a master device according to the presently disclosed technology, the synchronizing operation uses a snapshot of the master timing reference and a predetermined delay for a data packet containing the snapshot to be transmitted between the master device and the slave device.

In another example method for synchronizing a slave device to a master device according to the presently disclosed technology, the synchronizing operation uses a known packet rate of a series of incoming packets from the master device containing the master timing reference.

In another example method for synchronizing a slave device to a master device according to the presently disclosed technology, the dedicated data channel is a wireless connection between the master device and the slave device.

Another example clock synchronization network according to the presently disclosed technology comprises a master device and a slave device. The master device includes master timing circuitry to generate a master timing reference and a wireless radio transmitter to transmit the master timing reference with a fixed known delay on a dedicated wireless data channel. The slave device includes a wireless radio receiver to receive the master timing reference on the dedicated wireless data channel and slave timing circuitry to synchronize a slave timing reference to the master timing reference with a correction factor based on the fixed known delay.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method for synchronizing a computing device to a master device comprising:
   receiving a master timing reference from an intermediate device to the computing device over a dedicated data channel, wherein the master timing reference is generated by the master device; and
   synchronizing a slave timing reference of the computing device to the master timing reference to a resolution within one tick of the master timing reference using a snapshot of the master timing reference transmitted over the dedicated data channel and a fixed known delay for a data packet containing the snapshot to be transmitted between the master device and the computing device via the intermediate device, the fixed known delay including an internal processing delay at the master device and transit time between the master device and the computing device, wherein the transmit time includes a constant retransmission processing delay for each hop between the master device and the computing device and a number of hops between the master device and the computing device.

2. The method of claim 1, further comprising:
   generating the master timing reference using master timing circuitry; and
   transmitting the master timing reference from the master device outbound over the dedicated data channel.

3. The method of claim 1, wherein the dedicated data channel is one of a direct wireless connection and a wired connection between the master device and the computing device.

4. A computing device comprising:
   a data input configured to receive a master timing reference from an intermediate device over a dedicated data channel, wherein the master timing reference is generated by a master device; and
   timing circuitry configured to synchronize a slave timing reference to the master timing reference to a resolution within one tick of the master timing reference using a snapshot of the master timing reference transmitted over the dedicated data channel and a fixed known delay for a data packet containing the snapshot to be transmitted between the master device and the computing device via the intermediate device, the fixed known delay including an internal processing delay at the master device and transit time between the master device and the computing device, wherein the transmit time includes a constant retransmission processing delay for each hop between the master device and the computing device and a number of hops between the master device and the computing device.

5. The computing device of claim 4, wherein the fixed known delay further includes an internal processing delay at the computing device.

6. The computing device of claim 4, wherein the timing circuitry includes an oscillator that serves as a reference for a timer that generates the slave timing reference, and wherein the timing circuitry is to synchronize the slave timing reference by adjusting an oscillator count for toggling the slave timing reference.

7. The computing device of claim 4, wherein the slave timing reference is synchronized to the master timing reference without a round-trip time (RTT) measurement.

8. The computing device of claim 4, wherein the dedicated data channel is one of a direct wireless connection and a wired connection between the master device and the computing device.

9. The computing device of claim 4, wherein the data input is one of a wireless radio receiver and a wired input port.

10. The computing device of claim 4, wherein the master device is a component of an autonomous car, and the computing device is a sensor on the autonomous car.

11. The computing device of claim 4, wherein the master device and the computing device are each one or both of audio and video devices.

12. A computing device comprising:
a data input configured to receive a master timing reference from an intermediate device over a dedicated data channel, wherein the master timing reference is generated by a master device; and
timing circuitry configured to synchronize a slave timing reference to the master timing reference to a resolution within one tick of the master timing reference by comparing measured crystal ticks between a series of incoming timing packets to a known packet rate of the series of incoming timing packets received over the dedicated data channel from the master device to the computing device via the intermediate device, wherein the known packet rate includes a constant retransmission processing delay for each hop between the master device and the computing device and a number of hops between the master device and the computing device.

13. The computing device of claim 12, wherein the timing circuitry is further configured to synchronize the slave timing reference to the master timing reference using a fixed known delay over the dedicated data channel.

14. The computing device of claim 13, wherein the fixed known delay includes delays at one or more of: the master device, the computing device, and the dedicated data channel.

15. The computing device of claim 12, wherein the timing circuitry includes an oscillator that serves as a reference for a timer that generates the slave timing reference, and wherein the timing circuitry is to synchronize the slave timing reference by adjusting an oscillator count for toggling the slave timing reference.

16. The computing device of claim 12, wherein the slave timing reference is synchronized to the master timing reference without a round-trip time (RTT) measurement.

17. The computing device of claim 12, wherein the dedicated data channel is one of a direct wireless connection and a wired connection between the master device and the computing device.

18. The computing device of claim 12, wherein the data input is one of a wireless radio receiver and a wired input port.

19. The computing device of claim 12, wherein the master device is a component of an autonomous car, and the computing device is a sensor on the autonomous car.

20. The computing device of claim 12, wherein the master device and the computing device are each one or both of audio and video devices.

* * * * *